United States Patent
Feng et al.

(10) Patent No.: US 11,538,487 B2
(45) Date of Patent: Dec. 27, 2022

(54) VOICE SIGNAL ENHANCING METHOD AND DEVICE

(71) Applicant: YEALINK (XIAMEN) NETWORK TECHNOLOGY CO., LTD., Fujian (CN)

(72) Inventors: Wanjian Feng, Fujian (CN); Lianchang Zhang, Fujian (CN); Jiantao Liu, Fujian (CN)

(73) Assignee: YEALINK (XIAMEN) NETWORK TECHNOLOGY CO., LTD., Xiamen (CN)

(*) Notice: Subject to any disclaimer, the term of this patent is extended or adjusted under 35 U.S.C. 154(b) by 381 days.

(21) Appl. No.: 16/835,456

(22) Filed: Mar. 31, 2020

(65) Prior Publication Data

US 2020/0342892 A1    Oct. 29, 2020

(30) Foreign Application Priority Data

Apr. 24, 2019   (CN) .......................... 201910336274.0

(51) Int. Cl.
  *G10L 15/00*    (2013.01)
  *G10L 21/0272*  (2013.01)
  (Continued)

(52) U.S. Cl.
  CPC ............ *G10L 21/0272* (2013.01); *G06N 3/08* (2013.01); *G06N 20/00* (2019.01); *G10L 21/0208* (2013.01)

(58) Field of Classification Search
  CPC . G10L 21/0272; G10L 21/0208; G10L 15/22; G10L 15/00; G10L 25/00;
  (Continued)

(56) References Cited

U.S. PATENT DOCUMENTS

| | | | |
|---|---|---|---|
| 2004/0064307 A1* | 4/2004 | Scalart ................ | G10L 21/0208 704/205 |
| 2004/0078199 A1* | 4/2004 | Kremer ............... | G10L 21/0208 704/233 |
| 2007/0255535 A1* | 11/2007 | Marro .................... | G10L 21/02 704/226 |

OTHER PUBLICATIONS

S. R. Park and J. Lee, 'A Fully Convolutional Neural Network for Speech Enhancement'. arXiv, 2016. (Year: 2016).*

(Continued)

*Primary Examiner* — Bhavesh M Mehta
*Assistant Examiner* — Uthej Kunamneni

(57) ABSTRACT

The disclosure discloses a voice signal enhancing method and device, which divide a voice signal at the present scene into multiple frame signals based on a preset time interval; feed multiple frame signals into a trained neural network based on a preset step size, perform convolution operations on multiple frame signals through skip-connected convolutional layers to obtain multiple enhanced frame signals; superpose each enhanced frame signal according to the time domain of each enhanced frame signal to obtain an enhanced voice signal. Compared with the prior art, the present disclosure automatically enhances voice signals through the neural network without manual interference, so the effects and the application scenes of voice enhancement is not necessary to be limited by the preset method and method designers, thereby reducing the occurrence frequency of signal distortion and extra noises, which in turn improves the effects of the voice signal enhancement.

4 Claims, 2 Drawing Sheets

(51) Int. Cl.
*G06N 20/00* (2019.01)
*G06N 3/08* (2006.01)
*G10L 21/0208* (2013.01)

(58) Field of Classification Search
CPC ......... G10L 21/00; G10L 19/00; G06N 20/00; G06N 3/08
See application file for complete search history.

(56) References Cited

OTHER PUBLICATIONS

O. Ernst, S. E. Chazan, S. Gannot, and J. Goldberger, 'Speech Dereverberation Using Fully Convolutional Networks'. arXiv, 2018. (Year: 2018).*

* cited by examiner

VOICE SIGNAL ENHANCING METHOD AND DEVICE

CROSS-REFERENCE TO RELATED APPLICATIONS

The present application claims the benefit of Chinese Patent Application No. 201910336274.0 filed on Apr. 24, 2019, the contents of which are hereby incorporated by reference.

FIELD OF THE DISCLOSURE

The present disclosure relates to the technical field of voice signal processing and, in particular, to a voice signal enhancing method and device.

BACKGROUND OF THE DISCLOSURE

Voice signal enhancement is to improve the intelligibility of voice and to enhance voice that is contaminated by additive noise. It is mainly applied to communication devices, as well as hearing aids and such implanted devices as cochlear implants. Present voice signal enhancing methods generally employ "spectral subtraction", "Wiener filtering", "statistical model method", "subspace method", and the like. However, when the prior art is applied to voice signal enhancement, it is found that since the voice signal enhancing methods are in principle a manual preset method, the effects and application scenes are both limited by the preset method and method designers. In addition, since there is a wide variety of voice scenes in reality, signal distortion and extra noises are inevitable in the process of voice enhancement using the prior art. Therefore, in the face of complex voice scenes, the robustness of existing voice enhancement technologies is quite poor.

SUMMARY OF THE DISCLOSURE

The technical problem to be solved by the embodiments of the present disclosure is to provide a voice signal enhancing method and device in order to enhance voice signals in different scenes.

To solve the above problems, the embodiments of the present disclosure provide a voice signal enhancing method, comprising at least:

acquiring a voice signal in the present scene;

dividing the voice signal into frames according to a preset time interval to generate multiple frame signals;

feeding the multiple frame signals into a trained neural network according to a preset step size, and performing convolution operations on the multiple frame signals through skip-connected convolutional layers to obtain multiple enhanced frame signals;

superimposing each enhanced frame signal according to the time domain of each enhanced frame signal to obtain the enhanced voice signal.

Further, said dividing the voice signal into frames according to a preset time interval to generate multiple frame signals specifically comprises:

dividing the voice signal into frames according to a preset time interval, applying a Hanning window on the framed voice signals and then implementing a DFT on them in order to generate multiple frame signals.

Further, the training method of the neural network is:

acquiring multiple noise signals and multiple clear signals without noises;

mixing the multiple noise signals and multiple clear signals one by one according to randomly generated mixing coefficients to obtain multiple noise-bearing signals; wherein a noise signal is mixed with a clear signal to form a noise-bearing signal;

feeding the multiple noise-bearing signals sequentially into the neural network for signal enhancement to generate multiple corresponding denoised signals and adjusting the neural network according to the least square error between the denoised signals and the corresponding clear signals thereof.

Further, said feeding the multiple noise-bearing signals sequentially into the neural network for signal enhancement to generate multiple corresponding denoised signals and adjusting the neural network according to the least square error between the denoised signals and the corresponding clear signals thereof specifically comprises:

feeding the noise-bearing signal into the neural network, adjusting the neural network according to the least square error between a denoised signal generated by the signal enhancement of the noise-bearing signal through the neural network and the corresponding clear signal, continuing to adjust the neural network according to the least square error between a denoised signal generated by the signal enhancement of next noise-bearing signal through the neural network and the corresponding clear signal, and until the least square error obtained by using different noise-bearing signals is unchanged, terminating the training of the neural network.

Further, the neural network comprises N successive convolutional layers; every two symmetric convolutional layers with the N/2th convolutional layer as an axis of symmetry are skip connected to each other; wherein N is an even number.

Further, a voice signal enhancement device is provided, comprising:

a signal acquisition module, configured for acquiring a voice signal at the present scene;

a signal framing module, configured for framing the voice signal according to a preset time interval to generate multiple frame signals;

a signal enhancing module, configured for feeding the multiple frame signals into a trained neural network based on a preset step size and implementing convolution operations on the multiple frame signals through skip-connected convolutional layers to obtain multiple enhanced frame signals;

a signal output module, configured for superimposing each enhanced frame signal according to a time domain of each enhanced frame signal to obtain the enhanced voice signal.

Further, the signal framing module is specifically configured for:

dividing the voice signal into frames according to a preset time interval, applying a Hanning window on the framed voice signals and then implementing a DFT on them in order to generate multiple frame signals.

Further, the training method of the neural network is:

acquiring multiple noise signals and multiple clear signals without noises;

mixing the multiple noise signals and multiple clear signals one by one according to randomly generated mixing coefficients to obtain multiple noise-bearing signals; wherein a noise signal is mixed with a clear signal to form a noise-bearing signal;

feeding the multiple noise-bearing signals sequentially into the neural network for signal enhancement to generate multiple corresponding denoised signals and adjusting the neural network according to the least square error between the denoised signals and the corresponding clear signals thereof.

Further, said feeding the multiple noise-bearing signals sequentially into the neural network for signal enhancement to generate multiple corresponding denoised signals and adjusting the neural network according to the least square error between the denoised signals and the corresponding clear signals thereof specifically comprises:

feeding the noise-bearing signal into the neural network, adjusting the neural network according to the least square error between a denoised signal generated by the signal enhancement of the noise-bearing signal through the neural network and the corresponding clear signal, continuing to adjust the neural network according to the least square error between a denoised signal generated by the signal enhancement of next noise-bearing signal through the neural network and the corresponding clear signal, and until the least square error obtained by using different noise-bearing signals is unchanged, terminating the training of the neural network.

Further, the neural network comprises N successive convolutional layers; every two symmetric convolutional layers with the N/2th convolutional layer as an axis of symmetry are skip connected to each other.

The implementation of the embodiments of the present disclosure has the following beneficial effects:

the voice signal enhancing method and device provided in the embodiments of the present disclosure divide a voice signal at the present scene into multiple frame signals based on a preset time interval; feed multiple frame signals into a trained neural network based on a preset step size, perform convolution operations on multiple frame signals through skip-connected convolutional layers to obtain multiple enhanced frame signals; superpose each enhanced frame signal according to the time domain of each enhanced frame signal to obtain an enhanced voice signal. Compared with the prior art, the present disclosure automatically enhances voice signals through the neural network without manual interference, so the effects and the application scenes of voice enhancement is not necessary to be limited by the preset method and method designers, thereby reducing the occurrence frequency of signal distortion and extra noises, which in turn improves the effects of the voice signal enhancement.

DETAILED DESCRIPTION OF ILLUSTRATED EMBODIMENTS

Figure 1:
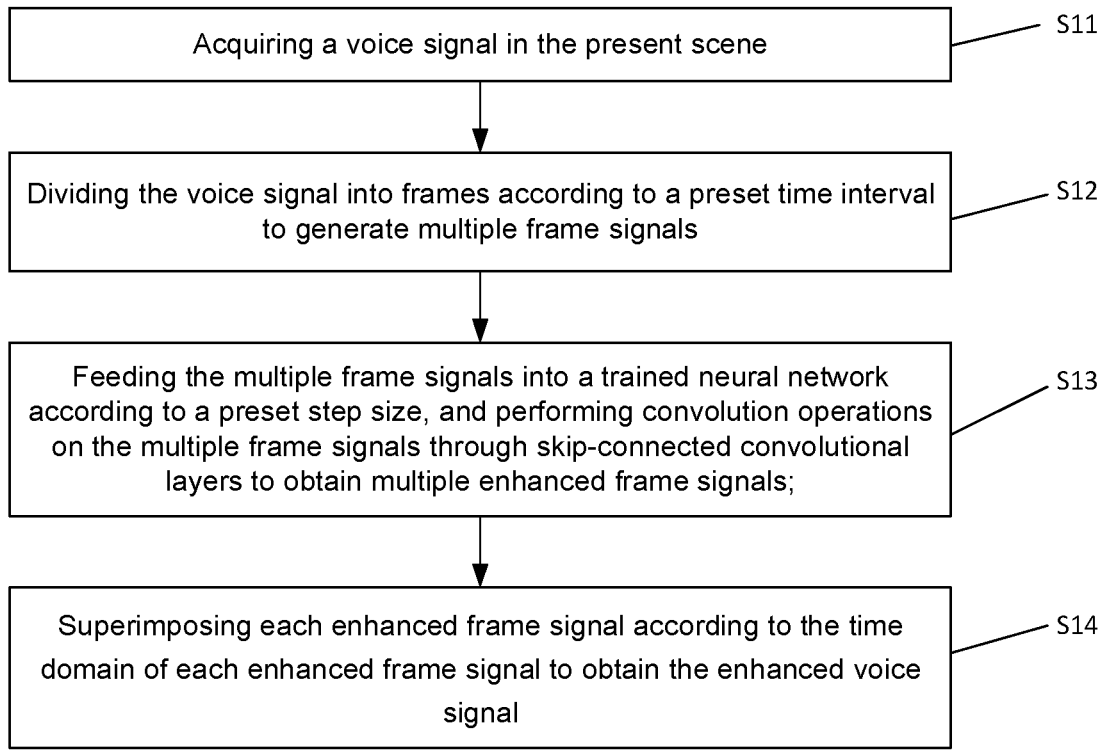
FIG. 1 is the schematic flowchart of the voice signal enhancing method according to one embodiment of the present disclosure.

The technical solutions in the embodiments of the present disclosure are clearly and completely described below with reference to the drawings in the embodiments of the present disclosure. Obviously, the described embodiments are only part of the embodiments of the present disclosure, but not all of the embodiments. Based on the embodiments of the present disclosure, other embodiments obtained by those skilled in the art with the premise that no inventive efforts are involved are within the scope of the present disclosure.

Below, the present disclosure is introduced with reference to flowcharts and/or methods, devices, and running diagrams of computer program products in different embodiments of the present disclosure. It should be clear that the flowcharts and or the blocks of the running diagrams and the combination of the flowcharts and/or the blocks of the running diagrams can be implemented by analog and/or digital hardware and/or computer program instructions. These computer program instructions can be provided to general purpose computers, dedicated computers, ASIC, and/or the processors of other programmable data processing devices to make devices realizing the designated functions/actions of the flowcharts and/or running diagrams when these instructions are implemented by computers and/or the processors of other programmable data processing devices. In some substitute embodiments, the functions/actions recorded in the drawings may occur not in the sequence in the flowcharts and/or running diagrams. For example, two successive operations may be implemented roughly in parallel in reality, or, depending on related functions/actions, the operations sometimes may be implemented in reversed sequence.

See FIG. 1.

Referring to FIG. 1, it is a schematic flowchart of the voice signal enhancing method according to one embodiment of the present disclosure. As shown in FIG. 1, the voice signal enhancing method comprises:

Step S11: acquiring a voice signal in the present scene.

Since the sound source with a sampling frequency of 22.05 kHz has already achieved the sound quality of the FM broadcast, it can be clearly recognized. If the sound source of 22.05 kHz or higher is acquired for the voice signal enhancement, the effects are not significant. Therefore, in this embodiment, the sound source with a sampling frequency of 16 kHz in the present scene is acquired as a voice signal.

Thereinto, the voice signal in the present scene may be acquired by such audio recorder as microphones and pick-ups.

Step S12: dividing the voice signal into frames according to a preset time interval to generate multiple frame signals.

Specifically, divide the voice signal into frames through digital signal processors according to a preset time interval, apply a Hanning window on the framed voice signals and then implement a DFT on them in order to generate multiple frame signals.

In this embodiment, the preset time interval is 16 ms.

Step S13: feeding the multiple frame signals into a trained neural network through neural network processors according to a preset step size and performing convolution operations on the multiple frame signals through skip-connected convolutional layers to obtain multiple enhanced frame signals.

Since there are signal overlaps among the multiple frame signals, in this embodiment, with steps size of 50% of the frame length, the multiple frame signals are generated in order and fed into the trained neural network every 10 frames.

Thereinto, the neural network processors may consist of multiple CPUs, which process signals together when the signals enter.

Step S14: superimposing each enhanced frame signal according to the time domain of each enhanced frame signal to obtain the enhanced voice signal.

Considering that there is signal overlap between the multiple enhanced frame signals, in the present embodiment, each of the enhanced frame signals is reconstructed into a time domain signal by a preset overlap superposition method of voice synthesis processors, and the said time domain signal is the enhanced voice signal, which is output to external memories or audio receiving devices connected to the output terminal of the voice synthesis processors.

Thereinto, the voice synthesis processors may be DSP chip.

Figure 2:
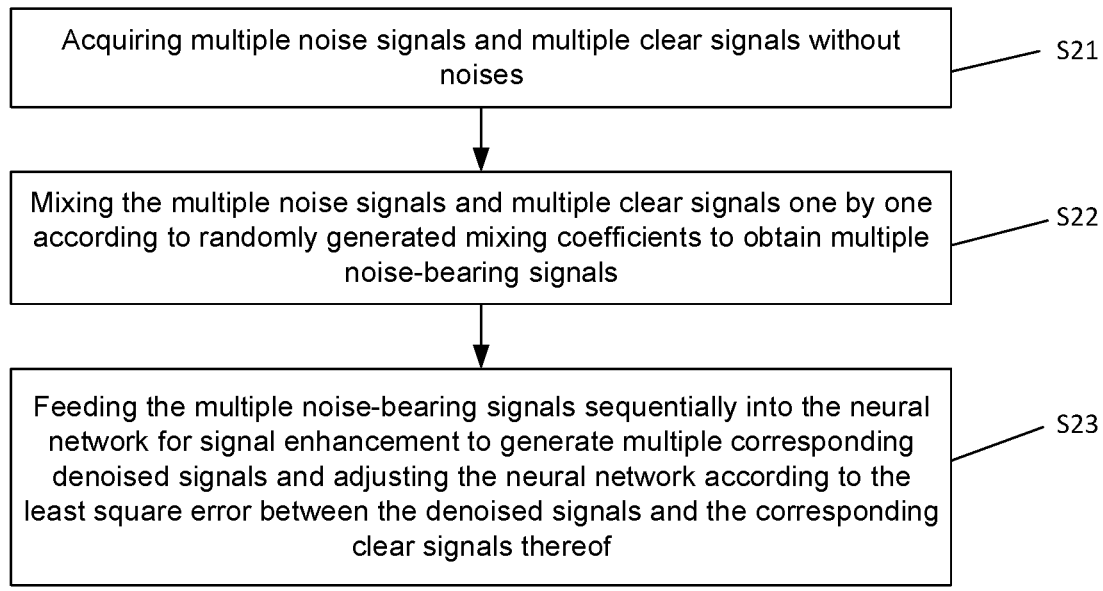
FIG. 2 is the schematic flowchart of the training method of the neural network enhancing method according to one embodiment of the present disclosure.

See FIG. 2.

Further, referring to FIG. 2, it is a schematic flowchart of the training method of the neural network according to an embodiment of the present disclosure, comprising:

S21, acquiring multiple noise signals and multiple clear signals without noises.

In this embodiment, after the acquired multiple noise signals and multiple clear signals without noises are classified into a data pool, the multiple noise signals in the data pool are respectively labeled with noise 1, noise 2, . . . , and noise N1, and the multiple clear signals in the data pool are respectively labeled with voice 1, voice 2, . . . , and voice N2.

S22: mixing the multiple noise signals and multiple clear signals one by one according to randomly generated mixing coefficients to obtain multiple noise-bearing signals.

Thereinto, a noise signal is mixed with a clear signal to form a noise-bearing signal.

In this embodiment, a random integer RND1 ranging from 1 to N1 is randomly generated. According to the random integer, a noise signal corresponding to the digital number is obtained from the data pool and marked as noise RND1. A random integer RND2 ranging from 1 to N2 is then randomly generated. According to the random integer, the clear signal corresponding to the digital number is obtained from the data pool and marked as voice RND2. A random number RND3 ranging from 0 to 1 is generated. The noise RND1 and the voice RND2 are mixed according to the coefficient RND3. After a noise-bearing signal is generated, repeat the above process to obtain multiple noise-bearing signals.

S23: feeding the multiple noise-bearing signals sequentially into the neural network for signal enhancement to generate multiple corresponding denoised signals and adjusting the neural network according to the least square error between the denoised signals and the corresponding clear signals thereof.

Specifically, feed the noise-bearing signal into the neural network, adjust the neural network according to the least square error between a denoised signal generated by the signal enhancement of the noise-bearing signal through the neural network and the corresponding clear signal, continue to adjust the neural network according to the least square error between a denoised signal generated by the signal enhancement of next noise-bearing signal through the neural network and the corresponding clear signal, and until the least square error obtained by using different noise-bearing signals is unchanged, terminate the training of the neural network.

In this embodiment, feed the noisy signal into the neural network, and after obtaining the denoised signal, calculate the least square error between the denoised signal and the corresponding clear signal, in order to adjust the neural network through optimizing the network parameters of the neural network by using Adam optimizer according to the least square error.

In this embodiment, the neural network comprises N successive convolutional layers, and every two symmetric convolutional layers with the N/2th convolutional layer as an axis of symmetry are skip connected to each other, wherein N is an even number.

Specifically, the neural network consists of 12 convolutional layers, each convolutional layer is followed by a batch normalization (BN) layer and finally is activated by a linear rectified unit (ReLU) activation function. The number of channels per convolution layer is centered on the sixth layer and symmetrically arranged on both sides. The symmetric convolution pairs, layer 2 and 10, layer 3 and 9, layer 4 and 8, layer 5 and 7, are skip connected respectively. The data fed into the neural network are performed the last convolution operation after convolved through the first 11 layers, and finally the output data of the same shape as the input is obtained. The specific channel number and convolution kernel size are shown in the following table:

| Layer name | Input feature | Output feature | Kernal size |
| --- | --- | --- | --- |
| Convolution1 | 1 | 8 | 9 |
| Convolution2 | 8 | 12 | 9 |
| Convolution3 | 12 | 16 | 7 |
| Convolution4 | 16 | 20 | 7 |
| Convolution5 | 20 | 24 | 5 |
| Convolution6 | 24 | 28 | 5 |
| Convolution7 | 28 | 24 | 5 |
| Convolution8 | 24 | 20 | 7 |
| Convolution9 | 20 | 16 | 7 |
| Convolution10 | 16 | 12 | 9 |
| Convolution11 | 12 | 8 | 9 |
| Final Convolution | 8 | 1 | 129 |

Figure 3:
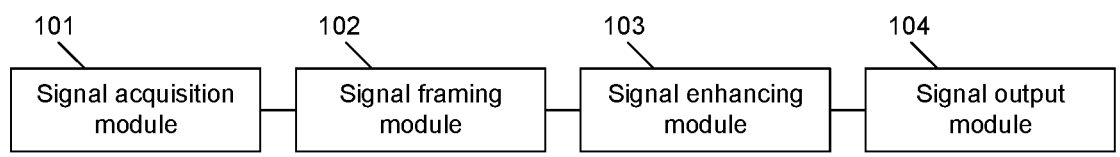
FIG. 3 is the schematic view of the voice signal enhancing device according to one embodiment of the present disclosure.

See FIG. 3.

Further, referring to FIG. 3, it is a schematic view of the voice signal enhancing device provided by an embodiment of the present disclosure, comprising: a signal acquisition module 101, a signal framing module 102, a signal enhancing module 103, and a signal output module 104, wherein the signal acquisition module 101 may be such audio recorders as microphones and pickups, the signal framing module 102 may be digital signal processors, the signal enhancing module 103 may be neural network processors, and the signal output module 104 may be voice synthesis processors. The output terminal of the audio recorders is connected to the input terminal of the digital signal processors, the output terminal of the digital signal processors is connected to the input terminal of the neural network processors, the output terminal of the neural network processors is connected to the input terminal of the voice synthesis processors, and the output terminal of the voice synthesis processors is used to connect external memories or audio receiving devices, etc.

It should be noted that the neural network may consist of multiple CPUs, and the voice synthesis processors may be DSP chips.

The signal acquisition module 101 is configured for acquiring a voice signal at the present scene.

Since the sound source with a sampling frequency of 22.05 kHz has already achieved the sound quality of the FM broadcast, it can be clearly recognized. If the sound source of 22.05 kHz or higher is acquired for the voice signal enhancement, the effects are not significant. Therefore, in this embodiment, the sound source with a sampling frequency of 16 kHz in the present scene is acquired as a voice signal.

The signal framing module 102 is configured for framing the voice signal according to a preset time interval to generate multiple frame signals.

In this embodiment, the signal framing module 102 is specifically configured for dividing the voice signal into frames according to a preset time interval, applying a Hanning window on the framed voice signals and then implementing a DFT on them to generate multiple frame signals.

In this embodiment, the preset time interval is 16 ms.

The signal enhancing module 103 is configured for feeding the multiple frame signals into a trained neural network based on a preset step size and implement convolution operations on the multiple frame signals through skip-connected convolutional layers to obtain multiple enhanced frame signals.

Since there are signal overlaps among the multiple frame signals, in this embodiment, the signal enhancing module 103 generate the multiple frame signals in order with steps size of 50% of the frame length and feed them into the trained neural network every 10 frames.

The signal output module 104 is configured for superimposing each enhanced frame signal according to a time domain of each enhanced frame signal to obtain the enhanced voice signal.

Considering that there is signal overlap between the multiple enhanced frame signals, in the present embodiment, the signal output module 104 is configured for reconstructing the enhanced frame signals into a time domain signal through an overlap superposition method. The time domain signal is the enhanced voice signal, which is output to external memories or audio receiving devices or the like connected to the output terminal of the signal output module 104.

It is clear that the functional blocks in FIG. 3 may be implemented through diverse ways, such as software modules, objects, and the like. It is further clear that the control structure in FIG. 3 is provided for illustrative purpose, and the embodiments of the present disclosure may also employ many other different control structures. These control structures may generally comprise digital control structure, analog control structure, and the combination thereof. For example, all or part of the functional blocks in FIG. 3 may be replaced by analog circuit executing the same functions.

the embodiments of the present disclosure provides a voice signal enhancing method and device, which divide a voice signal at the present scene into multiple frame signals based on a preset time interval; feed multiple frame signals into a trained neural network based on a preset step size, perform convolution operations on multiple frame signals through skip-connected convolutional layers to obtain multiple enhanced frame signals; superpose each enhanced frame signal according to the time domain of each enhanced frame signal to obtain an enhanced voice signal. Compared with the prior art, the present disclosure automatically enhances voice signals through the neural network without manual interference, so the effects and the application scenes of voice enhancement is not necessary to be limited by the preset method and method designers, thereby reducing the occurrence frequency of signal distortion and extra noises, which in turn improves the effects of the voice signal enhancement.

Another embodiment of the present disclosure also provides a voice signal enhancing terminal device, comprising a processor, a memory, and computer programs stored in the memory and configured to be executed by the processor, wherein the processor implements the voice signal enhancing method as described in the above embodiments when executing the computer programs.

Above are preferred embodiments of the present disclosure. It should be noted that those skilled in the art can also make several improvements and refinements without departing from the principles of the present disclosure. These improvements and refinements are also considered within the scope of the present disclosure.

Those skilled in the art should understand that implementing all or part of the process of the above embodiments can be accomplished by instructing related hardware through computer programs, and the programs can be stored in a readable storage medium of a computer. When the programs are executed, the flow of the embodiments of the methods as described above may be included. Thereinto, the storage medium may be a magnetic disk, an optical disk, a read-only memory (ROM), or a random-access memory (RAM), etc.

What is claimed is:

1. A voice signal enhancing method, comprising:
   acquiring a voice signal in the present scene; dividing the voice signal into frames according to a preset time interval to generate multiple frame signals;
   feeding the multiple frame signals into a trained neural network according to a preset step size, and performing convolution operations on the multiple frame signals through skip-connected convolutional layers to obtain multiple enhanced frame signals; and
   superimposing each enhanced frame signal according to the time domain of each enhanced frame signal to obtain the enhanced voice signal;
   wherein the trained neural network consists of twelve successive convolutional layers, each convolutional layer is followed by a batch normalization layer and finally is activated by a rectified linear unit activation function; channels of each convolutional layer are centered on the sixth convolutional layer and symmetrically arranged on both sides of the sixth convolutional layer; symmetric convolution pairs of the second convolutional layer and the tenth convolutional layer, symmetric convolution pairs of the third convolutional layer and the ninth convolutional layer, symmetric convolution pairs of the fourth convolutional layer and the eighth convolutional layer, and symmetric convolution pairs of the fifth convolutional layer and the seventh convolutional layer, are skip connected respectively.

2. The voice signal enhancing method according to claim 1, wherein said dividing the voice signal into frames according to a preset time interval to generate multiple frame signals specifically comprises:
   dividing the voice signal into frames according to a preset time interval, applying a Hanning window on the framed voice signals and then implementing a DFT on them in order to generate multiple frame signals.

3. The voice signal enhancing method according to claim 1, wherein the training method of the neural network is:
   acquiring multiple noise signals and multiple clear signals without noises;
   mixing the multiple noise signals and multiple clear signals one by one according to randomly generated mixing coefficients to obtain multiple noise-bearing signals; wherein a noise signal is mixed with a clear signal to form a noise-bearing signal; and
   feeding the multiple noise-bearing signals sequentially into the neural network for signal enhancement to generate multiple corresponding denoised signals and adjusting the neural network according to the least square error between the denoised signals and the corresponding clear signals thereof.

4. The voice signal enhancing method according to claim 3, wherein said feeding the multiple noise-bearing signals sequentially into the neural network for signal enhancement to generate multiple corresponding denoised signals and adjusting the neural network according to the least square error between the denoised signals and the corresponding clear signals thereof specifically comprises:

feeding the noise-bearing signal into the neural network, adjusting the neural network according to the least square error between a denoised signal generated by the signal enhancement of the noise-bearing signal through the neural network and the corresponding clear signal, continuing to adjust the neural network according to the least square error between a denoised signal generated by the signal enhancement of next noise-bearing signal through the neural network and the corresponding clear signal, and until the least square error obtained by using different noise-bearing signals is unchanged, terminating the training of the neural network.

\* \* \* \* \*